US006851857B2

(12) United States Patent
Miyata

(10) Patent No.: US 6,851,857 B2
(45) Date of Patent: Feb. 8, 2005

(54) LINEAR MOTION GUIDE UNIT

(75) Inventor: Yoshiharu Miyata, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 82 days.

(21) Appl. No.: 10/359,567

(22) Filed: Feb. 7, 2003

(65) Prior Publication Data

US 2003/0156768 A1 Aug. 21, 2003

(30) Foreign Application Priority Data

Feb. 19, 2002 (JP) ....................................... 2002-040977

(51) Int. Cl.[7] ................................................ F16C 29/06
(52) U.S. Cl. ............................................ 384/45; 384/15
(58) Field of Search ............................... 384/15, 44, 45

(56) References Cited

U.S. PATENT DOCUMENTS 5,374,126 A * 12/1994 Akasako et al. .............. 384/15
6,309,107 B1 * 10/2001 Ueki et al. .................... 384/45

FOREIGN PATENT DOCUMENTS

JP 11-30234 2/1999
JP 2001-12465 1/2001

* cited by examiner

*Primary Examiner*—Thomas R. Hannon
(74) *Attorney, Agent, or Firm*—Browdy and Neimark, P.L.L.C.

(57) ABSTRACT

A linear motion guide unit makes it possible to mount precisely a track rail to a machine bed and also reduce sliding resistance that might be encountered when a slider moves over the track rail. On a sidewise outside surface of a side wall of the track rail there is made a bulged portion that spreads in width H from a lower surface of the side wall up to a level above the center of gravity G of the track rail. The bulged portion has a sidewise outermost surface that is processed to provide a surface of reference, which can match a mating surface of reference made on the fixed bed. The slider has an upper seal to close a clearance left between a fore-and-aft side of the slider and a lengthwise inside surface of any one of the side walls of the track rail, while a recess is cut in the inside surface of the side wall in a way extending lengthwise of the track rail so as to allow the upper seal to come in sliding contact at a lip thereof with the recess.

17 Claims, 6 Drawing Sheets

F/G. 1
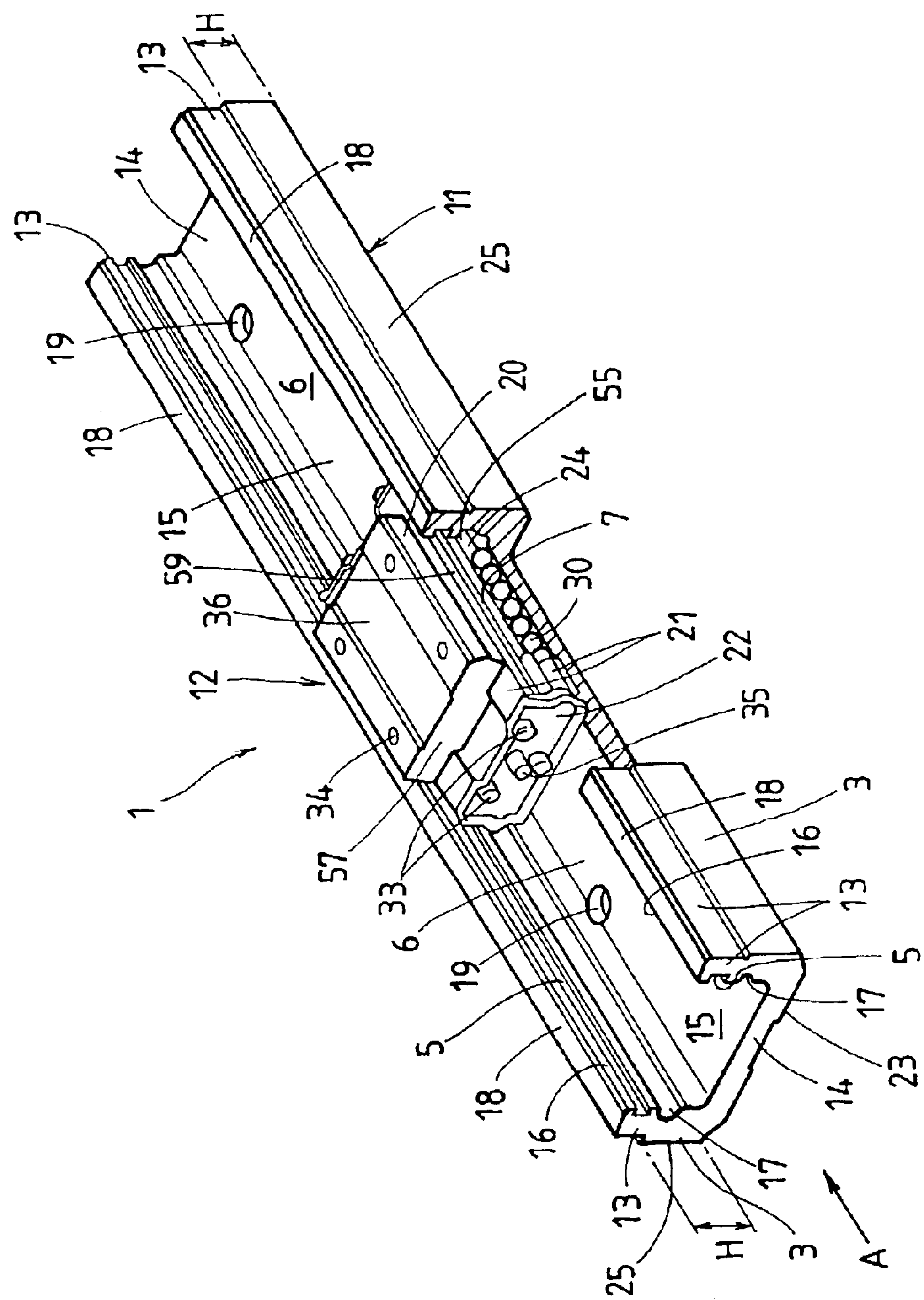

F/G. 2
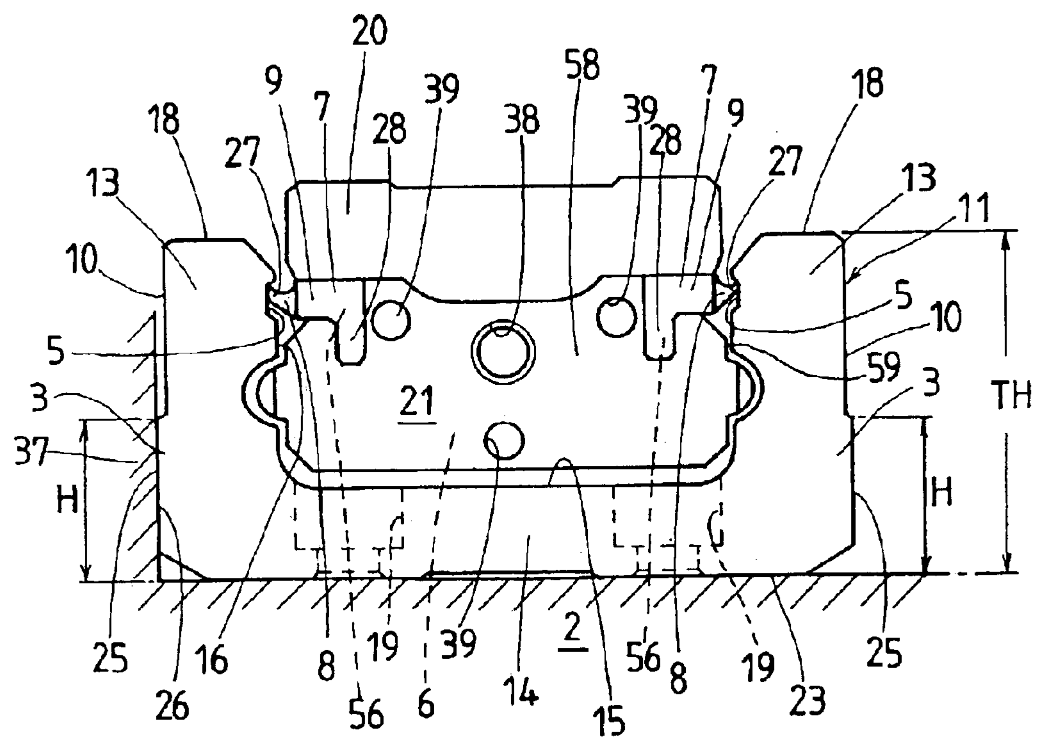
F/G. 3
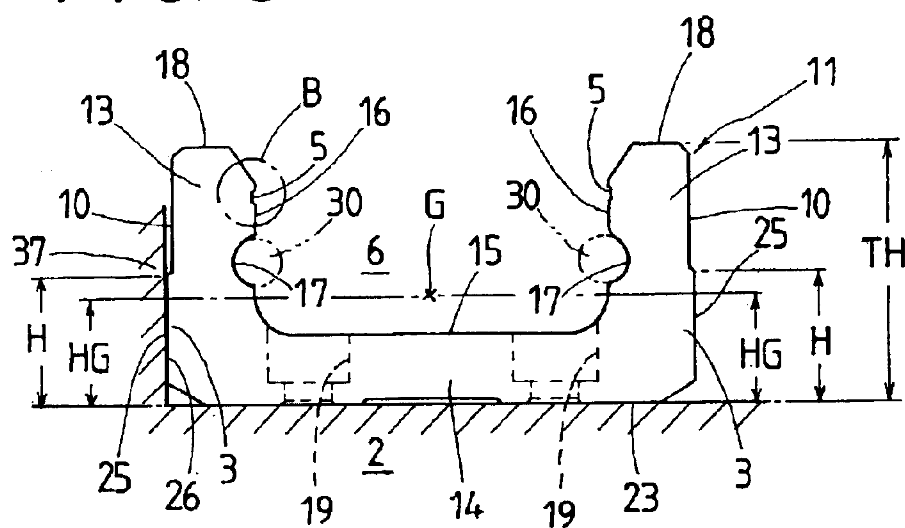

LINEAR MOTION GUIDE UNIT

BACKGROUND OF THE INVENTION

1. Field of the Invention

The present invention relates to a linear motion guide unit having wide application in sliding parts incorporated in, for example, assembling machines including semiconductor manufacturing equipments and so on, numerically controlled machine tools, measuring instruments, testing machines and the like. More particularly, it relates to a linear motion guide unit in which a slider is forced to move lengthwise along a track rail.

2. Description of the Prior Art

Linear motion guide units have been universally recognized for fundamental and versatile means to more encourage the recently remarkable growth of mechatronics. Although the linear motion guide units have been extensively built in machinery in fields as diverse as assembling machines including semiconductor manufacturing equipments and so on, numerically controlled machine tools, measuring instruments, testing machines and the like, the expansion of uses accompanied by the current developments in technologies requires more and more such linear motion guide units that can manage growing demands for high precision, low-frictional resistance, high-speed moving, easy assemblage, versatility and the like.

Conventionally, there is well known a linear motion guide unit of the sort disclosed in, for example Japanese Patent Laid-Open No. 2001-12465, which is a co-pending application filed by the present assignee. With the prior linear motion guide unit recited above, both the track rail and the slider are made on their sides with surfaces of reference, which are instrumental in setting the track rail and the slider on any machine bed and table, respectively, in their precise positions, keeping the working table against any deviation in position and any change in posture. The track rail is fixed to the machine bed with fastening bolts, with the side and bottom surfaces of reference coming into face-to-face abutment to their associated mating side and top surfaces of the machine bed, one to each mating surface, in their precise positions. The slider is also secured at a slider head thereof to the moving table with fastening bolts, with the side and upper surfaces of reference being brought into face-to-face engagement with their associated mating side and lower surfaces of the table, one to each mating surface, in their precise positions.

In a currently reality, moreover, the linear motion guide unit is expected to be less expensive, even with high precision. With the linear motion guide unit in which the track rail is made up of a pair of widthwise opposing sides and a bottom joined together to form an upward opened recess of U-shape in cross section as disclosed in Japanese Patent Laid-Open No. 2001-12465, the convexities bulged sidewise out of the sides of the track rail is small or narrow in width. This means that the track rail is unsteady in machining and, therefore, too troublesome in machining process to process it with accuracy.

Japanese Patent Laid-Open No. 11-30234, which is also another co-pending application of the present assignee, discloses a slide unit in which a recirculating-ball screw fits in a track rail of U-shape in cross section and an upper seal closes a clearance left between an upper face of a raceway groove on the slider and the track rail. With the prior slide unit recited just earlier, in which the track rail is composed of a pair of widthwise opposing sides and a bottom joined together to form an upward opened recess of U-shape in cross section, the track rail remains left coarse on its inside surface coming in sliding engagement with the lip of the upper seal mounted on the slider. This means it is very tough to move smoothly the slider, so that the sealing effect would be vulnerable.

Moreover, a track rail 40 as shown in FIG. 10 has been known for the linear motion guide unit. The track rail 40 is made up of a pair of side walls 43, 43 extending lengthwise in parallel with one another and a bottom 44 extending integrally with the side walls 43, 43. The track rail 40 is to be laid on a fixed base including machine beds and so on, with a lower surface 42 abutting against the fixed base, and fastened thereto. The side walls 43, 43 rise at right to the bottom 44 in a way their top faces 49 are in flush with each other. Between the sidewise opposing side walls 43, 43 of the guide rail 40 there is defined a guide channel 62 in which a slider will be accommodated for sliding travel lengthwise of the track rail 40. Sidewise outside surfaces 45 of the track rail 40 bulge out partly at 41, while inside surfaces 47 of the track rail 40 are made with raceway grooves 46, one to each inside surface. With the track rail 40 constructed as stated earlier, the bulged portions 41 above the sidewise outside surfaces 45 are each made to have a sidewise outermost face 48 that reaches in width HP less than a distance ranging from the lower surface 42 of the track rail 40 to the rail's center of gravity GP. That is to say, the sidewise outermost faces 48 on the bulged portions 41 are each formed to have the width HP that is curbed below the rail's center of gravity GP or made less than the height HGP of the center of gravity, which is measured from the lower surface 42 of the track rail 40 to the rail's center of gravity GP.

With the track rail 40 in which the sidewise outermost faces 48 of the bulged portions 41 are each made to have the width HP curbed below the height HGP of the center of gravity, measured from the lower surface 42 of the track rail 40 to the rail's center of gravity GP as stated earlier, now assuming the situation where the track rail 40 can not exempt from choosing, for example any one sidewise outermost face 48 on the bulged portions 41 for a surface of reference to fasten precisely the track rail 40 to the fixed bed. When the track rail 40 is laid down on a top plane 51 of a jig 50 in a fashion lying on the sidewise outermost face 48 of any one bulged portion 41 to come in contact with the top plane 51 of the jig 50, the top face 49 of the side wall 43 lying on the jig 50 leans downward against the top plane 51 because the sidewise outermost face 48 is too narrow or small. Eventually the track rail 40 would result in tilting θ degrees relatively to a plane normal to the top plane 51 of the jig 50. In order for the guide rail 40 to remain lying steady on the top plane 51 of the jig 50 in a vertical posture where the sidewise outermost face 48 of the bulged portion 41 is kept throughout in close engagement with the top plane 51 of the jig 50 without leaning away from the top plane 51, a different jig needs to be replaced for every track rail 40. The prior track rail 40, because of the sidewise outermost face 48 on the bulged portion 41 being small in width as stated earlier, is very tough to have the sidewise outermost face 48 on the bulged portion 41, which is precisely processed to make a just right angle or 90° with the lower surface 42 of the track rail 40. Thus, it has been much difficult so far to count on the sidewise outermost face 48 of the bulged portion 41 to provide the surface of reference, which could be mated with the fixed surface of reference on the machine bed.

For the linear motion guide unit compact or slim in construction in which the slider can travel relatively to the track rail with being less subjected to frictional resistance, thus, it has been expected to more quickly and precisely mount the worktable to the slider or mount the stationary bed to the track rail at a preselected mounting position and posture and further make certain that the slider and the track rail are kept at their mounting position and posture preselected with respect to, for example the worktable and the machine bed, respectively, even after a prolonged period of use.

SUMMARY OF THE INVENTION

The present invention, therefore, has as its primary object to overcome the problem as described just above and more particular to provide an improved linear motion guide unit in which a track rail can be simply and precisely set on a base of machinery or a machine bed at a preselected position while a slider is allowed to move smoothly relative to the track rail with less frictional resistance that might be encountered when the solid surfaces slider over each other. With the linear motion guide unit improved according to the present invention, the track rail includes widthwise opposing side walls having sidewise outside surfaces on which there are provided sidewise bulged portions out of the outside surfaces, one to each outside surface, the bulged portions being each made so wider that a sidewise outermost face on the bulged portion provides a surface of reference to set precisely the track rail on the fixed bed at a preselected position. Moreover, the present invention provides an improved linear motion guide unit in which the side walls of the track rail are made on widthwise opposing inside surfaces thereof with lengthwise recesses in which upper seals fit for sliding movement to make sure of low frictional resistance.

The present invention is concerned with a linear motion guide unit, comprising a track rail to be mounted to a bed and having a pair of side walls extending lengthwise in parallel with one another, and a slider movable lengthwise along the track rail in a guiding way defined between the side walls of the track rail, wherein the side walls of the track rail are each made on sidewise outside surface thereof with a bulged portion having a width across from a lower surface of the side wall to a level above the center of gravity of the track rail, and also the bulged portion has a surface finished in a surface of reference matching a mating surface of reference on the bed.

In one aspect of the present invention, a linear motion guide unit is disclosed in which the bulged portion is made on any one of the side walls of the track rail in a way extending in longitudinal direction of the track rail. As an alternative, the bulged portion is made on either only any one or both of the side walls of the track rail.

In another aspect of the present invention, a linear motion guide unit is disclosed in which the track rail is comprised of the widthwise opposing side walls and a bottom interconnecting the side walls with each other to define a recess of U-shape in cross section of the track rail.

In another aspect of the present invention, a linear motion guide unit is disclosed in which the bulged portion out of the side wall has the width that spreads across the center of gravity of the track rail by more than 1 mm. Nevertheless, it is preferable that the bulged portion out of the side wall has the width that is at most up to half a height of the side wall of the track rail.

Moreover, the present invention is concerned with a linear motion guide unit, comprising a track rail to be mounted to a bed and having a pair of side walls extending lengthwise in parallel with one another, and a slider movable lengthwise along the track rail in a guiding way defined between the side walls of the track rail, wherein the slider has an upper seal to close a clearance left between a fore-and-aft side of the slider and a lengthwise inside surface of any one of the side walls of the track rail, while a recess is cut in the inside surface of the side wall in a way extending lengthwise of the track rail so as to allow the upper seal to come in sliding contact at a lip thereof with the recess.

In another aspect of the present invention, a linear motion guide unit is disclosed in which the lip of the upper seal fits for sliding movement in the recess on the side wall in such a way that a lengthwise edge of the lip approaches the depth of the recesses as close as possible, with little clearance or no clearance remaining between them.

In a further another aspect of the present invention, a linear motion guide unit is disclosed in which the recess cut in the inside surface of the side wall is defined by opposite flanks extending lengthwise of the inside surface, with askew a preselected angle with respect to the associated inside surface, and a flat merged along opposite lengthwise edges thereof with the flanks to provide a smooth surface coming into sliding engagement with the lip of the upper seal.

In another aspect of the present invention, a linear motion guide unit is disclosed in which the slider is comprised of a carriage made on widthwise opposite sides thereof with raceway grooves, one to each side, which are arranged in opposition to their associated raceway grooves lying on inside surfaces of the side walls of the track rail, end caps arranged on forward and aft ends of the carriage, end seals attached on outside faces of the end caps, one to each cap, and rolling elements allowed to run through load raceways each of which is defined between any one of the raceway grooves on the carriage and the associated one of the raceway grooves on the side walls of the track rail.

In another aspect of the present invention, a linear motion guide unit is disclosed in which the upper seal is comprised of a metal backing plate arranged in a manner coming in abutment against the carriage and the end caps, and an elastic member with the lip fastened to the metal backing plate.

In a further another aspect of the present invention, a linear motion guide unit is disclosed in which the lip made on the elastic member in the upper seal gets caved at an upper surface thereof to provide a shape made tapered towards the recess on the track rail.

In another aspect of the present invention a linear motion guide unit is disclosed in which the upper seal includes a major portion extending lengthwise along by sides of the carriage and the end caps, and bent ends at forward-and-aft opposite ends of the major portion to be each placed between any one of the outside surfaces of the end caps and the associated end seal.

In another aspect of the present invention, a linear motion guide unit is disclosed in which each bent end of the metal backing plate for the upper seal includes an upper area substantially identical in width with the major portion of the metal backing plate and a lower area extending downwards from the upper area, and the bent ends are brought into engagement with mating areas made on the outside surfaces of the end caps.

In another aspect of the present invention, a linear motion guide unit is disclosed in which the lengthwise recesses are made in parallel with the raceway grooves on the inside surfaces of the side walls of the track rail and at the same time cutting the raceway grooves in the inside surfaces.

In a further another aspect of the present invention, a linear motion guide unit is disclosed in which the bottom of the track rail is made therein with bolt holes, in which bolts fit to fasten the track rail to the bed, while the slider is provided at an upper surface thereof with threaded holes that are used to fasten a table thereto.

With the linear motion guide unit constructed as stated earlier, the track rail can be installed more easily and quickly to the fixed machine bed in a desired position with accuracy. The bulged portions out of the track rail are allowed to make easily, quickly and inexpensively their sidewise outside surfaces into a surface of reference for mounting. Moreover, the slider can travel relatively to the track rail, with less subjected to sliding resistance. In accordance with the linear motion guide unit of the present invention, that is to say, the track rail can be set precisely in any desired position and posture to the bed by virtue of the surface of reference for mounting. The track rail set on the bed in the precise position helps keep the instrument such as a table in an accurate posture even after a prolonged period of use to move the slider with any table relatively to the track rail. This makes it possible to hold precisely the works, parts, instruments and so on in their preselected position and posture, which are desirable on processing and conveying the works in any of semiconductor manufacturing machines, testing instruments, measuring appliances, processing machines, assembling machines and the others.

With the linear motion guide in which the sidewise bulged portions out of the track rail is made to have the surface of reference of the width spreading across the center of gravity of the track rail as stated earlier, just lying the surface of reference on any bulged portion down on the mating surface of reference on the fixed bed in face-to-face contact relation is sufficient to set quickly the track rail to the bed in a high-precise position without any warp or tilt. Thus, the slider can be ensured in its high-precise travel with respect to the track rail. With the linear motion guide unit of the present invention, moreover, the side walls of the track rail is made on their inside surfaces with the recesses, one to each inside surface, extending in the moving direction of the slider to allow the upper seals on the slider to travel fore-and-aft with the lips of the upper seals being less subjected to any resistance, making certain of smooth movement of the slider with little resistance. Just making the bulged portion of the track rail larger in width and cutting the recesses in the inside surfaces of the side walls are necessary to realize the linear motion guide unit envisaged in the present invention. This means the linear motion guide unit can be produced simply and inexpensively.

With the linear motion guide unit of the present invention used in semiconductor manufacturing machines, testing instruments, measuring appliances, processing machines, assembling machines, and so on, the track rail can be set on the machine bed in a precise position. Thus, the instrument on the table fastened to the slider is allowed to travel with accuracy and also the slider can move smoothly in the longitudinal direction of the track rail, with less subjected to resistance.

BRIEF DESCRIPTION OF THE DRAWINGS

FIG. 1 is a perspective view, partially broken away, showing a preferred embodiment of a linear motion guide unit in accordance with the present invention:

FIG. 2 is a front elevation of the linear motion guide unit of FIG. 1 viewed from the side of an arrow A, but in which an end seal is removed:

FIG. 3 is a front elevational view of a track rail shown in FIG. 2:

DETAILED DESCRIPTION OF THE PREFERRED EMBODIMENTS

Figure 4:
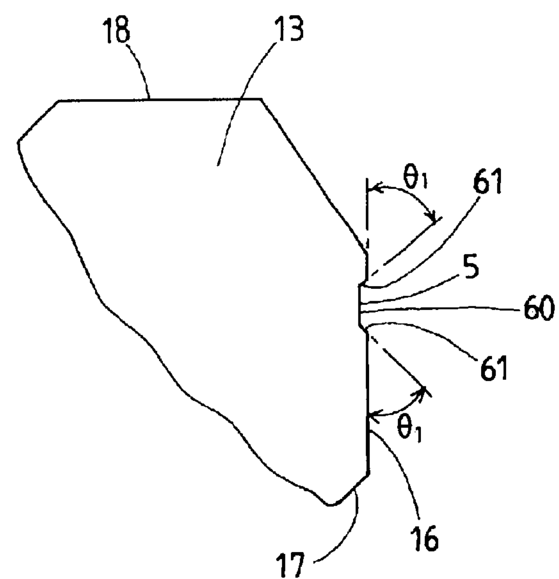
FIG. 4 is an enlarged view in elevation of an area surrounded with a circle B in FIG. 3.
Figure 5:
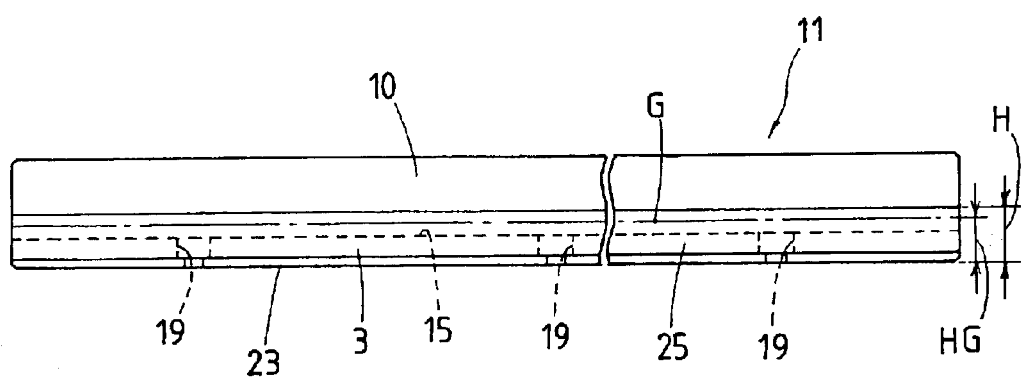
FIG. 5 is a side elevation, partially broken away, of the track rail shown in FIG. 3.

A preferred embodiment of a linear motion guide unit according to the present invention will be explained hereinafter in detail with reference to the accompanying drawings. The phraseology or terminology concerning relative location such as “top”, “upper”, “bottom”, “lower”, “side” etc. employed hereinafter is described on the assumption that the linear motion guide unit is used in the normal posture. It is to be thus understood that those words do not limit any of other postures including turning upside down and lying on its side, where the linear motion guide unit has been practiced.

The linear motion guide unit 1 of the present invention is comprised of an elongated track rail 11 and a slider 12 movable lengthwise relative to the track rail 11, and envisaged having wide application in sliding parts, not shown, of assembling machines including semiconductor manufacturing equipments and so on, numerically controlled machine tools, measuring instruments, testing machines and the like. The linear motion guide unit 1 is principally comprised of the elongated track rail 11 set on a fixed frame 2 including any base of machinery, machine bed, and so on at a preselected precise position, and the slider 12 allowed traveling along the longitudinal direction of the track rail 11. This elongated track rail 11 is formed to have an overall U-shape in cross-section, which is defined by a pair of widthwise opposing side walls 13 and a bottom 14 connecting the side walls 13 along their lower edges with one another. The slider 12 fits for sliding movement in an elongated recess 15 opened upwards between the side walls 13 to provide a guide channel 6 along which the slider 12 is allowed to move lengthwise relative to the track rail 11.

With the linear motion guide unit 1 constructed as stated earlier, the bottom 14 of the track rail 11 is made therein with bolt holes, not shown, in which bolts fit to fasten the track rail 11 to the fixed frame 2 including any base of machinery, machine bed, and so on. Moreover, the slider 12 is provided at an upper surface 36 thereof with threaded holes 34 that are used to fasten a table including various instruments, not shown, to the slider 12. Thus, the table having thereon instruments can travel relatively to the fixed bed 2 as the slider 12 moves in a sliding manner with respect to the track rail 11. Although but only one slider 12 is shown in the track rail 11 in the illustrative embodiment of FIG. 1, it will be appreciated that any number of sliders 12 may be arranged for the track rail 11. Generally speaking, the track rail 11 is made reduced as low as possible in height to make the linear motion guide unit compact or slim in construction.

The slider 12 is mainly comprised of a carriage 20 made on widthwise opposite sides thereof with raceway grooves 24, one to each side, which are arranged in opposition to their associated raceway grooves 17 lying on inside surfaces 16 of the side walls 13 of the track rail 11, end caps 21 arranged on forward and aft ends 57 of the carriage 20, one to each end, end seals 22 attached on outside faces 58 of the end caps 21, one to each cap, and rolling elements 30 of balls allowed to run through load raceways 55 each of which is defined between any one of the raceway grooves 24 on the carriage 20 and the associated one of the raceway grooves 17 on the side walls 13 of the track rail 11. The end caps 21 and end seals 22 are tightened together to the carriage 20 by means of machine screws 33, which are screwed into many matching holes bored in the carriage 20. The linear motion guide unit 1 is so constructed that the slider 12 is allowed to slide smoothly with respect to the track rail 11 as the rolling elements 30 run through the load raceways 55.

The carriage 20 is made in the form of a substantially rectangular parallelepiped having a width that may be nested snugly in the track rail 11. The carriage 20 is made as reduced as possible in height likewise with the track rail 11. The carriage 20 usually has thereon a slider head extending upward above top faces 18 of the side walls 13 of the track rail 11, while the height of the slider head above the top faces 18 of the side walls 13 is preferably curbed as low as possible, although depending on what type of table or instrument is mounted on the slider. Thus, the slider 12 constructed as stated earlier and the track rail 11 conjoin to help make the linear motion guide unit 1 much compact or slim in construction and further allow greater freedom in design of peripheral equipment including any drive means of the ball-screw drive or motor for moving the slider 12 relatively to the track rail 11, helping contribute to shrinkage of machinery or apparatus to which the linear motion guide unit 1 is applied.

Rolling elements, or balls 30, are incorporated in the linear motion guide unit 1 in such a manner as to run through recirculating paths, which are composed of load areas of raceways 55 defined between the confronting raceway grooves 17, 24, and non-loaded areas made up of return tunnels bored in the carriage 20 to lead the rolling elements 30 back to the load raceways and turnarounds formed in the end caps 21 to communicate the load raceways with the return tunnels. The slider 12 has a grease nipple 35 for applying lubricant to the recirculating paths, which is attached to any one of the end caps 21 to extend outside from the associated end seal 22 so as to supply the lubricant into the recirculating paths from the outside.

The slider 12 has mounted with upper seals 7 to cover the load raceways 55 left open between the carriage 20 of the slider 12 and the track rail 11 for protecting the load raceways 55 against foreign matter including dust and dirt, which might come down from above. To this end, the upper seals 7 are each fit in the slider 12 so as to lie between any one of fore-and-aft side surfaces 59 of the slider 12 and the associated lengthwise inside surface 16 on the side wall 13 of the track rail 11, as shown in FIGS. 1 and 2.

The end caps 21 are attached to the forward and aft ends 57 of the carriage 20 and made therein with the turnarounds, not shown, to allow the rolling elements 30 to turn round from the load raceways 55 to the return tunnels and vice versa. The end caps 21 are each provided therein with a port 38 ready for the grease nipple 35 and some threaded holes 39 for machine screws 33. The end seals 22 are moreover made at preselected locations thereof with an opening where the grease nipple 35 is led through there, and some holes where the machine screws 33 extend through there to be screwed into the carriage 20. The end seals 22 have lips arranged in alignment with the raceway grooves 17 to plug up forward and aft ends of the load raceways 55.

With the linear motion guide unit 1 according to the present invention, especially, the track rail 11 features that the side walls 13 are each made on the sidewise outside surface 10 thereof with a bulged or outwardly raised portion 3 that spreads in width H from a lower surface 23 of the side wall 13 up to a level above the center of gravity G of the track rail 11, and also the bulged portion 3 has a sidewise outermost surface 25 that is processed to provide a surface of reference, which as shown in FIG. 2 or 3 can lie in close contact relation with a mating surface 26 of reference made on a fixed member 37 of reference of the machine bed 2. The bulged portions 3 on the side walls 13 are made to extend lengthwise of the track rail 11. Although but the bulged portions 3 are raised outwardly above the sidewise opposite outside surfaces 10 of the side walls 11 of the track rail 11, one to each surface, it will be appreciated that only one of the sidewise outside surfaces 10 of the side walls 11 may be raised outwardly to make the bulged portion 3.

Figure 9:
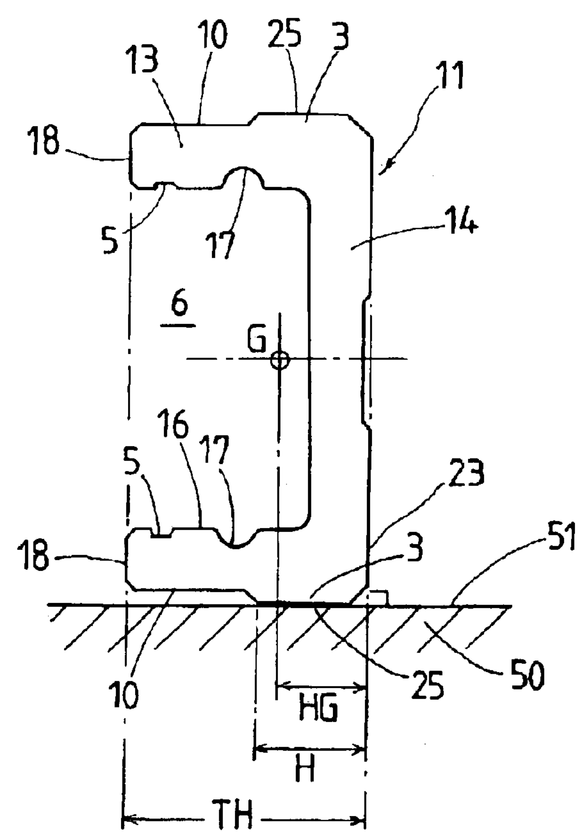
FIG. 9 is a schematic view explanatory of a situation where the track rail of FIG. 3 lies down on a fixed base of reference on a jig.
Figure 10:
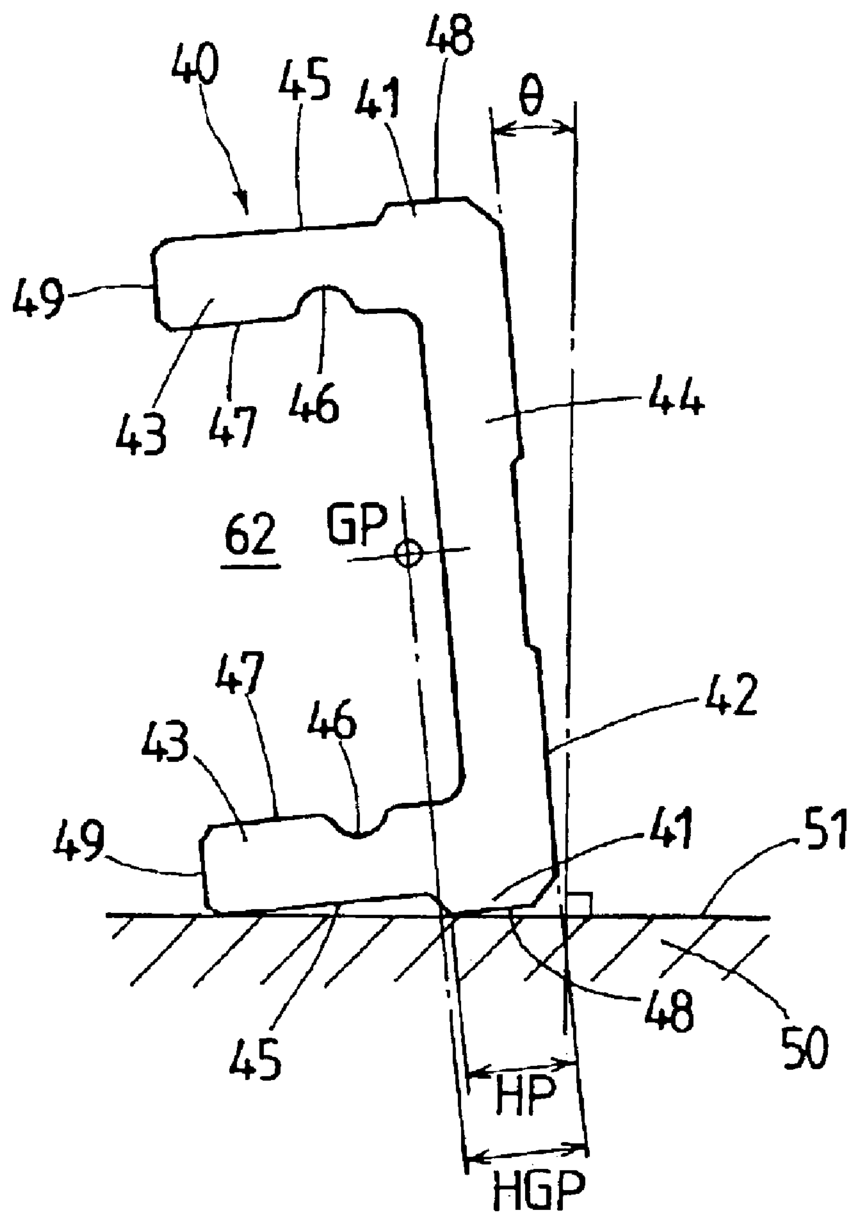
FIG. 10 is a schematic view illustrating a prior track rail laid down on a fixed base of reference on a jig.

When considering laying the track rail 11, as shown in FIG. 9, on a flat plane 51 of a jig 50 serving as the fixed base of reference for machining and examining the track rail 11, the track rail 11 would be allowed to lie steady down on the fixed base of reference or the flat plane 51 of jig 50 without toppling down because the bulged portion 3 is made so wide or large in width H as to spread across the center of gravity G of the track rail 11. The construction stated earlier makes certain that the track rail 11 of the linear motion guide unit 1 can be processed and examined in steady situation, making certain of the accuracy of the processing and examining with good stability. Processes used to manufacture the track rail 11 include, for example grinding operation to make the surface of reference on the bulged portion 3, reforming operation for relieving any stress that might be caused by hardening, and so on.

With the track rail 11 constructed as stated earlier, it will be preferred that the bulged portion 3 out of the side wall 13 has the width H that spreads across the center of gravity G of the track rail 11 by 1 mm or above considering any tolerance. By contrast, in case where the bulged portion 3 is made too large in its width H, the area where the surface 25 of reference comes in close contact with the mating surface 26 of reference made on the fixed member 37 of reference would get too wide to ensure the accuracy. Thus, the width H of the surface of reference recommended curbing any negative influence on the accuracy is at most up to half the overall height TH of the track rail 11. Now assuming that the overall height TH of the side wall 13 of the track rail 11 is, for example 30 mm and the center of gravity G of the track rail 11 is 10.9 mm above the lower surface 23 of the track rail 11, the width H of the bulged portion 3 should measure 15 mm.

The linear motion guide unit 1 of the present invention, moreover, features that the side walls 13 of the track rail 11 are made on their sidewise opposing inside surfaces 16 with recesses 5, one to each inside surface, in which lips 27 of the upper seals 7 fit for sliding movement at their lengthwise edges 54. Each recess 5 is cut in the inside surface 16 of the side wall 13 lengthwise of the side wall 13. The recess 5, as shown in FIG. 4, is defined by the combination of opposite flanks 61 extending lengthwise of the inside surface 16 of the side wall 13, with askew a preselected angle $\theta_1$ with respect to the associated inside surface 16, and a flat 60 merged along sidewise opposite edges thereof with the flanks 61 to provide a smooth surface 60 coming into sliding engagement with the associated edge 54 of the lip 27 of the upper seal 7. The lengthwise recess 5 made on the side wall 13 of the track rail 11, as being cut sideways in the inside surface 16 of the side wall 13 as shown in FIG. 4, helps make the construction effective to keep the associated load raceway 55 against invasive foreign matter including dust and dirt even if just a little clearance remains along the lip 27 of the upper seal 7.

Figure 6:
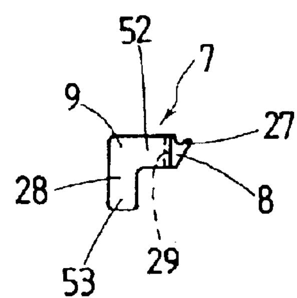
FIG. 6 is a front elevation of an upper seal to be used in a slider built in the linear motion guide unit of FIG. 1.
Figure 7:
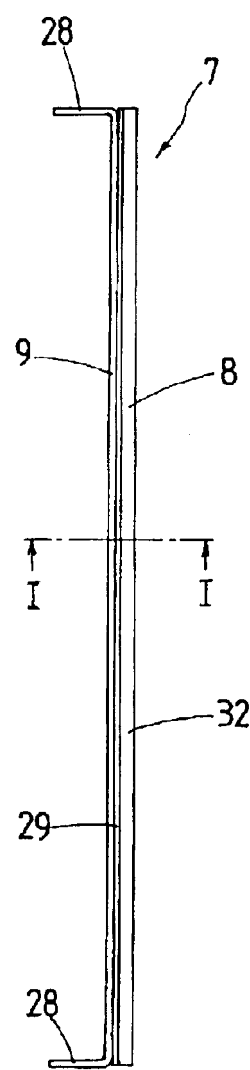
FIG. 7 is a plan view illustrating the upper seal shown in FIG. 6.
Figure 8:
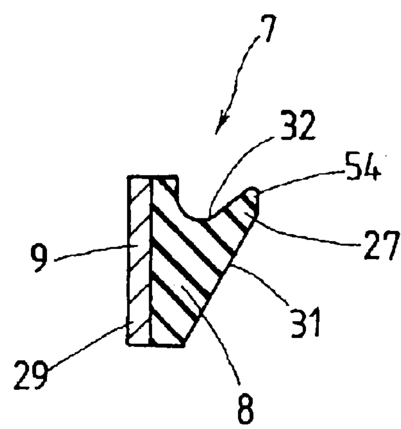
FIG. 8 is a cross-sectional view of the upper seal, the view being taken along a line I–I of FIG. 7.

The upper seal 7 is constructed as shown in FIGS. 6 to 8, and comprised of a metal backing plate 9 arranged in a manner coming in abutment along one lengthwise edge thereof against the carriage 20 and at forward and aft ends thereof against end caps 21, and an elastic member 8 with the lip 27 fastened to the metal backing plate 9. With the upper seal 7 constructed as stated earlier, the metal backing plate 9 is supported with the outside faces 58 of the end caps 21 in such a way that the lip 27 secured on the metal backing plate 9 comes in sliding fit at the lengthwise edge 27 thereof in the associated recess 5 on the track rail 11, ideally without leaving any clearance between them. The elastic member 8 in the upper seal 7 includes the lengthwise lip 27 that is defined by an upper surface and a slanting outside surface 31. The upper surface of the lip 27 especially gets caved as shown at 32 in FIG. 8, providing a specific lip shape made tapered towards the recess 5 on the track rail 11.

The metal backing plate 9 of the upper seal 7, as seen from FIG. 7, consists of a major portion 29 extending lengthwise along by the sides of the carriage 20 and the end caps 21, and bent ends 28 at forward-and-aft opposite ends of the major portion 29 to be each placed between any one of the outside surfaces 58 of the end caps 21 and the associated end seal 22. Each bent end 28 includes an upper area 52 substantially identical in width with the major portion 29 of the metal backing plate 9 and a lower area 53 extending downwards from the upper area 52. The bent ends 28 are brought into engagement with mating areas 56 made on the outside surfaces 58 of the end caps 21.

With the linear motion guide unit 1 stated earlier, the lips 27 of the upper seals 7 fit for sliding movement in the recesses 5 on the side walls 13 in such a way that the lengthwise edges 54, refer to FIG. 8, of the lips 27 approach the depth of the recesses 5 as close as possible, with little clearance, ideally no clearance remaining between them. This close relation of the lips 27 with the recesses 5 is preferable for reducing the sliding resistance that might be encountered when the slider 12 moves relatively to the track rail 11.

Upon production of the track rail 11 for the linear motion guide unit 1, the lengthwise recesses 5 are made in parallel with the raceway grooves 17 on the inside surfaces 16 of the side walls 13 of the track rail 11 and at the same time cutting the raceway grooves 17 in the inside surfaces 16. That is, the recesses 5 are cut simultaneously with the raceway grooves 17 in the inside surfaces 16 on the side walls 13. Simultaneous cutting of the recesses 5 with the raceway grooves 17 of the track rail 11 helps make sure of evenly sliding engagement of the upper seals 7 with the lengthwise recesses 5 of the track rail 11 to expect the smooth travel of the slider 12.

As the present invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds are therefore intended to embraced by the claims.

What is claimed is:

1. A linear motion guide unit, comprising a track rail to be mounted to a bed and having a pair of side walls extending lengthwise in parallel with one another, and a slider movable lengthwise along the track rail in a guiding way defined between the side walls of the track rail, wherein at least one side wall of the track rail is each made on sidewise outside surface thereof with a bulged portion having a width across from a lower surface of the side wall to a level above the center of gravity of the track rail, and also the bulged portion has a surface finished in a surface of reference matching a mating surface of reference on the bed.

2. A linear motion guide unit constructed as defined in claim 1 wherein the bulged portion is made on any one of the side walls of the track rail in a way extending in longitudinal direction of the track rail.

3. A linear motion guide unit constructed as defined in claim 1 wherein the bulged portion is made on both of the side walls of the track rail, one to each side wall.

4. A linear motion guide unit constructed as defined in claim 1 wherein the track rail is comprised of the widthwise opposing side walls and a bottom interconnecting the side walls with each other to define a recess of U-shape in cross section of the track rail.

5. A linear motion guide unit constructed as defined in claim 1 wherein the bulged portion out of the side wall has the width that spreads across the center of gravity of the track rail by more than 1 mm.

6. A linear motion guide unit constructed as defined in claim 1 wherein the bulged portion out of the side wall has the width that is at most up to half a height of the side wall of the track rail.

7. A linear motion guide unit constructed as defined in claim 1 wherein the slider has an upper seal to close a clearance left between a fore-and-aft side of the slider and a lengthwise inside surface of any one of the side walls of the track rail, while a recess is cut in the inside surface of the side wall in a way extending lengthwise of the track rail so as to allow the upper seal to come in sliding contact at a lengthwise edge thereof with the recess.

8. A linear motion guide unit constructed as defined in claim 7 wherein the lip of the upper seal fits for sliding movement in the recess on the side wall in such a way that a lengthwise edge of the lip approaches the depth of the recesses as close as possible, with little clearance or no clearance remaining between them.

9. A linear motion guide unit constructed as defined in claim 7 wherein the recess cut in the inside surface of the side wall is defined by opposite flanks extending lengthwise of the inside surface, with askew a preselected angle with respect to the associated inside surface, and a flat merged along opposite lengthwise edges thereof with the flanks to provide a smooth surface coming into sliding engagement with the lip of the upper seal.

10. A linear motion guide unit constructed as defined in claim 1 wherein the bottom of the track rail is made therein with bolt holes, in which bolts fit to fasten the track rail to the bed, while the slider is provided at an upper surface thereof with threaded holes that are used to fasten a table thereto.

11. A linear motion guide unit, comprising a track rail to be mounted to a bed and having a pair of side walls extending lengthwise in parallel with one another, and a slider movable lengthwise along the track rail in a guiding way defined between the side walls of the track rail, wherein the slider has an upper seal to close a clearance left between a fore-and-aft side of the slider and a lengthwise inside surface of any one of the side walls of the track rail, while a recess is cut in the inside surface of the side wall in a way extending lengthwise of the track rail so as to allow the upper seal to come in sliding contact at a lip thereof with the recess.

12. A linear motion guide unit constructed as defined in claim 11 wherein the slider is comprised of a carriage made on widthwise opposite sides thereof with raceway grooves, one to each side, which are arranged in opposition to their associated raceway grooves lying on inside surfaces of the side walls of the track rail, end caps arranged on forward and aft ends of the carriage, end seals attached on outside faces of the end caps, one to each cap, and rolling elements allowed to run through load raceways each of which is defined between any one of the raceway grooves on the carriage and the associated one of the raceway grooves on the side walls of the track rail.

13. A linear motion guide unit constructed as defined in claim 12 wherein the upper seal is comprised of a metal backing plate arranged in a manner coming in abutment against the carriage and the end caps, and an elastic member with the lip fastened to the metal backing plate.

14. A linear motion guide unit constructed as defined in claim 13 wherein the lip made on the elastic member in the upper seal gets caved at an upper surface thereof to provide a shape made tapered towards the recess on the track rail.

15. A linear motion guide unit constructed as defined in claim 13 wherein the upper seal includes a major portion extending lengthwise along by sides of the carriage and the end caps, and bent ends at forward-and-aft opposite ends of the major portion to be each placed between any one of the outside surfaces of the end caps and the associated end seal.

16. A linear motion guide unit constructed as defined in claim 15 wherein each bent end of the metal backing plate for the upper seal includes an upper area substantially identical in width with the major portion of the metal backing plate and a lower area extending downwards from the upper area, and the bent ends are brought into engagement with mating areas made on the outside surfaces of the end caps.

17. A linear motion guide unit constructed as defined in claim 12 wherein the lengthwise recesses are made in parallel with the raceway grooves on the inside surfaces of the side walls of the track rail and at the same time cutting the raceway grooves in the inside surfaces.

* * * * *